United States Patent
Doan et al.

(10) Patent No.: US 11,814,572 B2
(45) Date of Patent: *Nov. 14, 2023

(54) METHODS OF CEMENTING A WELLBORE WITHOUT USING A SPACER FLUID WITH A CHAIN EXTENDED NON-IONIC SURFACTANT

(71) Applicants: Angela Anh Doan, Spring, TX (US); Antonio Bottiglieri, Houston, TX (US); Daniel J. Daulton, The Woodlands, TX (US); Cresencio Perez, Katy, TX (US); Shanshan Huang, Middlesex (GB); David James Hoolas, Iford (GB); Emmanuel Therond, Egham (GB); Paulo Jorge da Cunha Gomes, Richmond (GB)

(72) Inventors: Angela Anh Doan, Spring, TX (US); Antonio Bottiglieri, Houston, TX (US); Daniel J. Daulton, The Woodlands, TX (US); Cresencio Perez, Katy, TX (US); Shanshan Huang, Middlesex (GB); David James Hoolas, Iford (GB); Emmanuel Therond, Egham (GB); Paulo Jorge da Cunha Gomes, Richmond (GB)

(73) Assignees: BAKER HUGHES OILFIELD OPERATIONS LLC, Houston, TX (US); BP EXPLORATION OPERATING COMPANY LIMITED, Middlesex (GB)

(*) Notice: Subject to any disclaimer, the term of this patent is extended or adjusted under 35 U.S.C. 154(b) by 0 days.

This patent is subject to a terminal disclaimer.

(21) Appl. No.: 17/669,971

(22) Filed: Feb. 11, 2022

(65) Prior Publication Data
US 2022/0162494 A1    May 26, 2022

Related U.S. Application Data

(63) Continuation of application No. 16/832,411, filed on Mar. 27, 2020, now Pat. No. 11,268,010.
(Continued)

(51) Int. Cl.
*C09K 8/467* (2006.01)
*C09K 8/487* (2006.01)
(Continued)

(52) U.S. Cl.
CPC .............. *C09K 8/487* (2013.01); *C09K 8/467* (2013.01); *E21B 33/13* (2013.01); *E21B 33/138* (2013.01); *E21B 33/14* (2013.01)

(58) Field of Classification Search
None
See application file for complete search history.

(56) References Cited

U.S. PATENT DOCUMENTS

| 4,646,834 A * | 3/1987 | Bannister ................ E21B 33/16 507/216 |
| 5,330,006 A | 7/1994 | Nahm et al. |

(Continued)

OTHER PUBLICATIONS

Cowan et al. "Surfactants Additives to Improve the Performance Properties of Cements", Society of Petroleum Engineers, SPE 25181, 1993, 11 pages.
(Continued)

*Primary Examiner* — Andrew Sue-Ako
(74) *Attorney, Agent, or Firm* — CANTOR COLBURN LLP (57) ABSTRACT

A method of cementing a wellbore includes injecting into the wellbore a non-aqueous fluid; injecting into the wellbore a cement slurry and a non-ionic surfactant composition after injecting the non-aqueous fluid; and allowing the cement slurry to set, wherein the non-ionic surfactant composition
(Continued)

comprises an alkyl end-capped ethoxylated fatty alcohol, a chain extended non-ionic surfactant, or a combination comprising at least one of the foregoing.

13 Claims, 6 Drawing Sheets

Related U.S. Application Data (60) Provisional application No. 62/825,247, filed on Mar. 28, 2019.

(51) Int. Cl.
*E21B 33/138* (2006.01)
*E21B 33/14* (2006.01)
*E21B 33/13* (2006.01)

(56) References Cited

U.S. PATENT DOCUMENTS

| | | | |
|---|---|---|---|
| 5,372,641 A * | 12/1994 | Carpenter | C09K 8/46 106/714 |
| 7,350,573 B2 | 4/2008 | Reddy | |
| 9,994,756 B2 | 6/2018 | Nelson | |
| 11,268,010 B2 * | 3/2022 | Doan | C09K 8/487 |
| 2006/0035789 A1 | 2/2006 | Mas et al. | |
| 2011/0306524 A1 | 12/2011 | Smith | |
| 2012/0024527 A1 * | 2/2012 | Tarafdar | C09K 8/46 568/608 |
| 2012/0241220 A1 | 9/2012 | Quintero et al. | |
| 2015/0041134 A1 | 2/2015 | Carelli et al. | |
| 2016/0265306 A1 | 9/2016 | Nelson | |
| 2016/0326421 A1 | 11/2016 | Yang | |
| 2018/0037792 A1 | 2/2018 | Champagne et al. | |
| 2019/0048247 A1 | 2/2019 | Pernites et al. | |

OTHER PUBLICATIONS

Harder et al. "Surfactant/Cement Blends Improve Plugging Operations in Oil-Base Muds", IADC/SPE 23928, 1992, 8 pages.

Hibbeler et al. "Cost-Effective Gas Control: A Case Study of Surfactant Cement", Society of Petroleum Engineers, SP 25323, 1993, 8 pages.

International Search Report for International Application No. PCT/US2020/025227, International Filing Date Mar. 27, 2020, dated Jul. 15, 2020, 3 pages.

Liu et al., "A Novel Method to Evaluate Cement-Shale Bond Strength", Society of Petroleum Engineers, SPE-173802-MS, 2015, 20 pages.

Pereira et al., "Use of Surfactant in Cement Slurry to Mitigate Incompatibility with Synthetic-Based Drilling Fluids", Offshore Technology Conference, OCT-27902-MS, 2017, 10 pages.

Written Opinion for International Application No. PCT/US2020/025227, International Filing Date Mar. 27, 2020, dated Jul. 15, 2020, 6 pages.

* cited by examiner

METHODS OF CEMENTING A WELLBORE WITHOUT USING A SPACER FLUID WITH A CHAIN EXTENDED NON-IONIC SURFACTANT

CROSS REFERENCE TO RELATED APPLICATIONS

This application is a continuation of U.S. patent application Ser. No. 16/832,411, filed Mar. 27, 2020, which claims the benefit of U.S. Provisional Application No. 62/825,247, filed Mar. 28, 2019, both of which are hereby incorporated in their entirety herein.

BACKGROUND

Zonal isolation with use of cement of oil or gas wells is a common operation in the art. In general, the goal of cementing is to secure a stable and effective seal in a designated location of the wellbore. In other cases, a cement operation may be used to provide a base for initiating a deviation or kick-off when a directional change in drilling is desired and or for temporary or permanent well abandonment.

Cementing systems are conveyed by pumping a cement slurry down a tubulars know as drill pipe, liner or casings. The pumped cement slurry generally displaces a wellbore fluid such as a drilling fluid, during placement then hardens forming a sealing barrier.

Cement spacers have been used to aid separating drilling fluids from cement slurries. Spacer is used as cushion between drilling fluid and cement which are typically incompatible. In addition, spacer is used to invert the wettability of the wellbore as drilling fluids can be oil based or synthetic based, i.e. hydrophobic, whereas cement needs hydrophilic surfaces. This water wet condition improves the downhole surfaces bonding potential for cement. This condition helps cement form an effective barrier. However, cement spacers may require extra mixing tanks and rig resources to be mixed properly. In addition, some known cement spacers are not entirely effective at mud removal, filter cake breakdown or separation of cement from drilling mud, and allow mixing and remixing of the fluids that they are designed to separate. Accordingly, there remains a need in the art for alternative methods of cementing a wellbore.

SUMMARY

A method of cementing a wellbore includes injecting into the wellbore a non-aqueous fluid; injecting into the wellbore a cement slurry and a non-ionic surfactant composition after injecting the non-aqueous fluid; and allowing the cement slurry to set, wherein the non-ionic surfactant composition comprises an alkyl end-capped ethoxylated fatty alcohol, a chain extended non-ionic surfactant, or a combination comprising at least one of the foregoing.

DETAILED DESCRIPTION

Generally speaking surfactants are chemicals which impart a desired effect upon the condition of the system they are added. The condition varies dependent upon the desire outcome, such as increased surface tension, reduce surface tension, impact wettability of fluid being treated or downhole surfaces. It has been found that surfactants as described herein impart desirable properties to cement slurries such that no spacer fluids are needed to separate non-aqueous fluids from cement slurries. Meanwhile, the cement slurries enhanced with surfactant technology enable "water wet" formation and casing thus promoting non-aqueous fluids removal and better cement bonding. Optionally, the surfactants can be introduced into the cement slurry "on-the-fly," which allows the real time adjustment of the final properties of the cement, and improves qualify control.

Non-ionic surfactants can be used. The HLB (hydrophilic lipophilic balance) of suitable non-ionic surfactants ranges from 6 to 13.5, and preferably from 8 to 12.5. In an embodiment, the non-ionic surfactants include an alkyl end-capped ethoxylated fatty alcohol, a chain extended non-ionic surfactant, or a combination comprising at least one of the foregoing. Optionally, no cationic or anionic surfactants are used in the cement slurry.

The alkyl end-capped ethoxylated fatty alcohol has a structure represented by the formula $R^1$—O—($CH_2$—$CH_2$—O)$_m R^2$, wherein $R^1$ is a saturated or unsaturated, linear or branched hydrocarbon radical having from 10 to 24 carbon atoms, $R^2$ is a linear or branched alkyl having from 1 to 10 carbon atoms, and m is an integer ranging from 3 to 50. Specifically, $R^1$ is a saturated or unsaturated, linear or branched aliphatic chain having from 10 to 24 carbon atoms, 10 to 20 carbon atoms, or 10 to 18 carbon atoms. Preferably $R^2$ is a linear or branched alkyl having from 1 to 8 carbon atoms, or 2 to 6 carbon atoms, or 4 carbon atoms. Preferably m is an integer ranging from 3 to 50, or 3 to 25, or 3 to 15, or 3 to 7. An illustrative alkyl end-capped ethoxylated fatty alcohol is a C12/C18 fatty alcohol ethoxylated with five EO groups and having a butyl-end cap. In such an alkyl end-capped ethoxylated fatty alcohol, $R^1$ is a $C_{12-18}$ alkyl, m is 5, and $R^2$ is butyl. When $R^2$ is butyl, the alkyl end-capped ethoxylated fatty alcohol can also be referred to as a butyl end-capped ethoxylated fatty alcohol. Advantageously, the cement slurry as disclosed herein does not foam when mixed with a butyl end-capped ethoxylated fatty alcohol.

The chain extended non-ionic surfactant has a structure represented by the formula: R-[L]$_x$-[O—$CH_2$—$CH_2$]$_y$—OH, where R is a linear or branched, saturated or unsaturated, substituted or unsubstituted, aliphatic or aromatic hydrocarbon radical having from about 6 to 20 carbon atoms; L is a block of poly-propylene oxide, a block of poly-ethylene oxide, a block of poly-butylene oxide or a combination thereof; x is 3 to 30 or 5 to 15; and y is 1 to 5. Preferably R is a $C_{6-18}$ aliphatic group or $C_{6-18}$ alkyl.

In an embodiment, the chain extended non-ionic surfactant has a structure represented by the formula R—[O—$CH_2$—$CH_2]_a$—[O—$CH(CH_3)$—$CH_2]_b$—[O—$CH_2$—$CH_2]_y$—OH, where R is an aliphatic group having from about 6 to about 20 carbon atoms, y is 1 to 5, and the sum of a and b is from 3 to 30. Preferably R is an alkyl group having from 6 to 20 or 6 to 18 carbon atoms, and the sum of a and b is 5 to 15. As a specific example, the chain extended non-ionic surfactant can be a 2-ethyl hexanol EO-PO non-ionic surfactant (CAS #64366-70-7).

The surfactants as disclosed herein can be added to a cement slurry that comprises an aqueous carrier, a cement component, and an additive comprising a setting accelerator, a setting retardant, a gelling agent, a fluid loss control agent, an extender, a defoamer, a weighting agent, a dispersant, a thixotropic agent, a bridging agent or lost circulation material, a silicate material, a clay stabilizer, or a combination comprising at least one of the foregoing.

The aqueous carrier is present in the cement slurries in an amount of about 10% to about 120% by weight, more preferably in an amount of about 30% to about 70% by weight, based on the total weight of the cement component. The aqueous carrier fluid can be fresh water, brine (including seawater), an aqueous base, or a combination comprising at least one of the foregoing.

The brine can be, for example, seawater, produced water, completion brine, or a combination comprising at least one of the foregoing. The properties of the brine can depend on the identity and components of the brine. Seawater, for example, can contain numerous constituents including sulfate, bromine, and trace metals, beyond typical halide-containing salts. Produced water can be water extracted from a production reservoir (e.g., hydrocarbon reservoir) or produced from an underground reservoir source of fresh water or brackish water. Produced water can also be referred to as reservoir brine and contain components including barium, strontium, and heavy metals. In addition to naturally occurring brines (e.g., seawater and produced water), completion brine can be synthesized from fresh water by addition of various salts for example, KCl, NaCl, $ZnCl_2$, $MgCl_2$, or $CaCl_2$) to increase the density of the brine, such as 11.6 pounds per gallon of $CaCl_2$) brine.

The cement component of the cement slurry can be any cementitious material that sets and hardens by reaction with water, and is suitable for forming a set cement downhole, including mortars and concretes. Suitable cement components include those typically employed in a wellbore environment, for example those comprising calcium, aluminum, silicon, oxygen, and/or sulfur. Such cements include, but are not limited to, Portland cements, pozzolan cements, gypsum cements, high alumina content cements, silica cements, and high alkalinity cements, or combinations of these. Portland cements are particularly useful. In some embodiments, the Portland cements that are suited for use are classified as Class A, B, C, G, and H cements according to American Petroleum Institute, API Specification for Materials and Testing for Well Cements, and ASTM Portland cements classified as Type I, II, III, IV, and V. The cements herein also can include various concretes by the further addition of aggregates, such as a coarse aggregate made of gravel or crushed rocks such as chert, quartzite, granite, and/or a fine aggregate such as sand or crushed sand. Aggregate can be added in an amount of about 10% to about 70% by weight of the hydraulic cement, and more particularly about 20% to about 40% by weight.

The cement slurries can further comprise other components (additives) known for use in cementing, for example a setting accelerator to reduce setting time, a setting retardant to extend setting time, a fluid loss control agent, an extender to lower density, a gelling agent to increase viscosity, a defoamer to reduce foaming, a weighting agent to increase density, a dispersant to reduce viscosity, other fluid loss control agents, thixotropic agents, a bridging agent or lost circulation material (e.g., gilsonite or cellophane flakes), silicate materials such as sand, silica flour, fumed silica, act to strengthen cement as well as protect from strength retrogression effects at temperatures above 230° F., clay stabilizers, or a combination comprising at least one of the foregoing. These additive components are selected to avoid imparting unfavorable characteristics to the cement slurries, and to avoid damaging the wellbore or subterranean formation. Each additive can be present in amounts generally known to those of skill in the art.

Setting accelerators include compounds such as triethanolamines, calcium chloride, potassium chloride, sodium chloride, sodium formate, sodium nitrate, and other alkali and alkaline earth metal halides, formates, nitrates, and sulfates.

Setting retardants include compounds such as such as hydroxycarboxylic acids and their salts, such as sodium tartrate, sodium citrate, sodium gluconate, sodium itaconate, tartaric acid, citric acid, and gluconic acid, lignosulfonates, saccharides, polysaccharides, organophosphates such as $C_{2-12}$ alkylene phosphonic acids, salts such as sodium chloride, and oxides of zinc and lead, and the like.

Gelling agents include compounds such as guar, welan, xanthan, diutan, dextran gum, starch, starch derivatives, polysaccharides, cellulose, cellulosic derivatives, hydroxyalkyl cellulose, carboxyalkyl celluloses, carboxyalkyl hydroxyalkyl celluloses, dialkyl carboxyalkyl celluloses and mixtures thereof.

Extenders include low density aggregates, clays such as hydrous aluminum silicates (e.g., bentonite (85% mineral clay smectite), pozzolan (finely ground pumice of fly ash), diatomaceous earth, silica, e.g., a quartz and condensed silica fumed silica, expanded Pearlite, gilsonite, powdered coal, and the like.

Defoamers include polysiloxanes, paraffinic oils, mineral oils, vegetable oils as well as the mixtures.

Weighting agents are high-specific gravity and finely divided solid materials used to increase density. The rare earth-containing compound can be the only weighting agents present in a cement slurry. Alternatively, the rare earth-containing compounds can be used together with other weighting agents such as silica flour, fly ash, calcium carbonate, barite, hematite, ilmenite, siderite, and the like.

Examples of suitable dispersants include but are not limited to naphthalene sulfonate formaldehyde condensates, acetone formaldehyde sulfite condensates, and glucan delta lactone derivatives. Other dispersants can also be used depending on the application of interest.

Fluid loss control agents can be present, for example a latex, latex copolymers, nonionic, water-soluble synthetic polymers and copolymers, such as guar gums and their derivatives, poly(ethyleneimine), cellulose derivatives, and polystyrene sulfonate.

Clay stabilizers prevent a clay from swelling downhole upon contact with the water or applied fracturing pressure and can be, for example, a quaternary amine, a brine (e.g., KCl brine), choline chloride, tetramethyl ammonium chloride, or the like. Clay stabilizers also include various salts such as NaCl, CaCl$_2$), and KCl, which also act at low concentrations to generally accelerate the set time associated with a cement slurry.

The cement component can be present in the slurry in an amount of about 50 to about 95 wt. %, preferably about 60 to about 90 wt. %, more preferably about 65 to about 85 wt. %, based on the sum of the weight of the cement component and the additive.

The cement slurry can have a viscosity lower than 600 mPa-s at a shear rate of 100 s$^{-1}$ at 23° C. The cement slurry is a low-density cement slurry or a high-density cement slurry. The density of a scavenger or low-density cement slurry can vary with such densities between about 9 up to about 15 pounds per gallon, or about 10 to about 14 pounds per gallons, or about 11 up to about 13 pounds per gallon. The high-density cement slurries can have a density of about 15 to about 25 pounds per gallon. In an embodiment, the cement slurry has a density of about 10 to about 20 pounds per gallon or about 12 to about 18 pounds per gallon.

Figure 7:
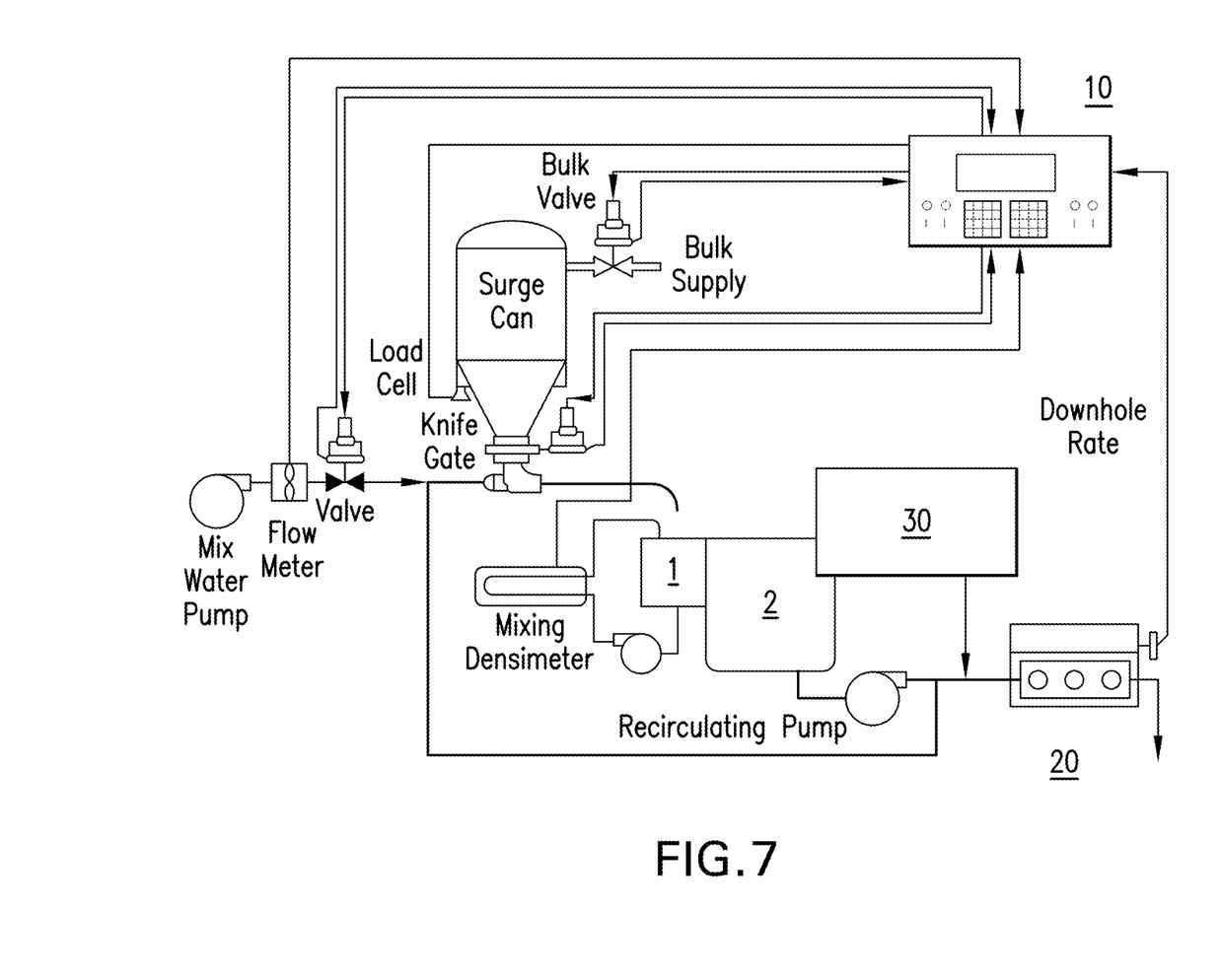
FIG. 7 is a simplified scheme illustrating a continuous process of adding surfactants to cement slurries "on the fly."

The surfactants can be added to the cement slurry "on the fly" via an additive injection nozzle or a chemical injection pump. In other words, the surfactant composition is added to the cement slurry while the slurry is pumped downhole. The method allows the dynamic adjustment of the relative amounts of the surfactant composition and the cement slurry. Accordingly, the method can include adjusting amounts of the cement slurry, the surfactant composition, or a combination thereof in situ while the cement slurry and the surfactant compositions are injected into the wellbore. FIG. 7 is a simplified scheme illustrating a continuous process of adding surfactants to cement slurries "on the fly." As shown in FIG. 7, bulk dry cement and additives are mixed with water at vessels 1 and 2 to form cement slurries. The amounts of dry cement, additives, and the water mixed can be controlled by controller 10. Surfactant compositions can be added to the cement slurries via a chemical injection pump 30. The amount of the surfactants added can be adjusted in-situ with controller 10. The cement slurry together with the surfactants can be injected downhole via pump 20.

Alternatively, the cement slurry is pre-mixed with the surfactant composition on site in a vessel such as a mixer, blender, and the like to provide a mixing water fluid for final cement slurry.

The surfactants can be added in an amount of about 0.1 to about 1, preferably about 0.2 to about 0.75, more preferably about 0.25 to about 0.5 gallon per sack of the cement component.

The cement slurry together with the surfactants can displace non-aqueous fluids. In non-aqueous fluids, solid particles are suspended in natural oil or refined oil and water or brine in emulsified condition. The oil is typically the continuous phase. As used herein, non-aqueous fluids include all oil-based fluids which are free of water as well as water-in-oil emulsions where the oil is the continuous phase and water is the discontinuous phase.

In an embodiment, the non-aqueous fluids are oil-based drilling fluids. The oil-based drilling fluids can be all-oil based or water-in-oil emulsions. The carrier for the oil-based drillings include a diesel oil, a paraffin oil, a vegetable oil, a soybean oil, a mineral oil, an aliphatic solvent, an aromatic solvent, or a synthetic oil, or a combination comprising at least one of the foregoing. Known additives typically used in the drilling fluids include but are not limited to clay, viscosifiers, defoamers, fluid loss agents, bentonite, and potassium formate.

Figure 1:
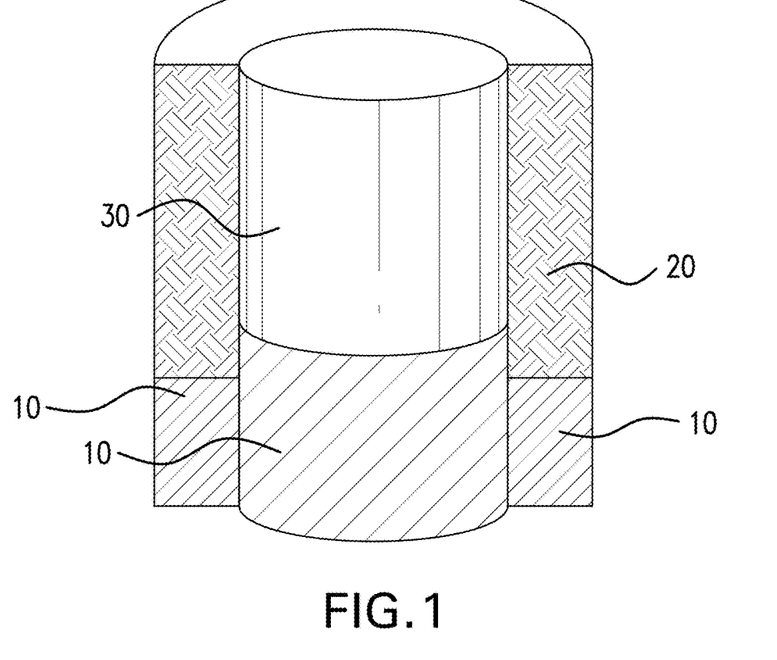
FIG. 1 illustrates a conventional mud/spacer/cement system.
Figure 2:
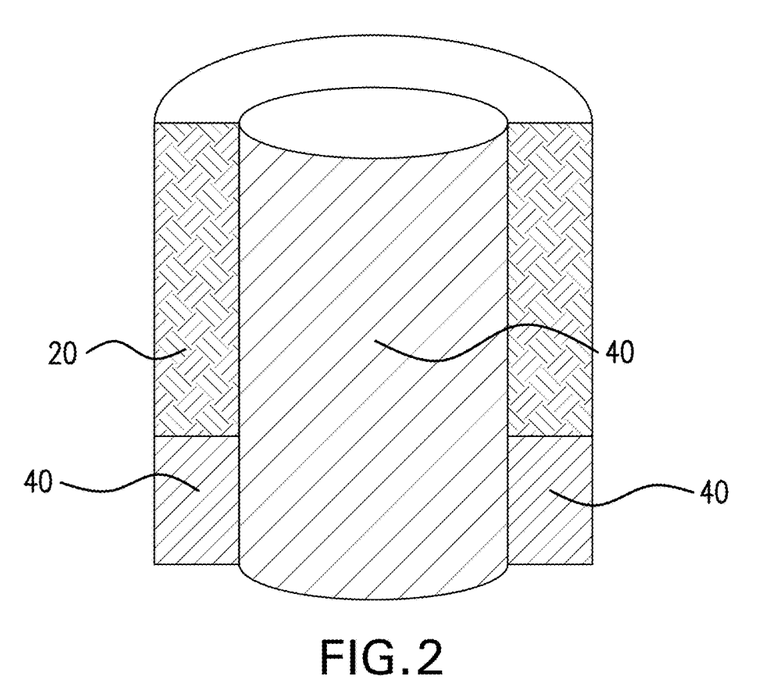
FIG. 2 illustrates a mud/cement system without using any spacer.

As illustrated in FIG. 1, conventionally, a spacer fluid (10) separates a non-aqueous fluid (20) from a cement slurry (30). In the method described herein, no spacer fluids are used. Thus the cement slurry containing the surfactant (40) is in direct physical contact with the non-aqueous fluid (20) in the wellbore. Optionally the surfactants are added to the cement slurry only to help the slurry to displace the non-aqueous fluids.

The method can be used in various applications. In an embodiment, the cement slurry is used to form downhole barriers, including various casings, seals, plugs, packers, liners, and the like.

The beneficial effects of using surfactants in cement slurries are further illustrated in the following examples.

EXAMPLES

API testing was conducted according to API RP 10B-2 second edition, April 2013 to compare cement properties of the cement slurries with and without surfactants.

Rotor test was carried out according to the following procedure: the weight of the sleeve was measured before testing and recorded as Mass A. A drilling fluid was loaded into a rheology cup. The cup was placed on the base and raised up slowly until the drilling fluid was even with the line inscribed on the outer surface of the rotary sleeve. The sleeve was rotated at 100 RPM for 5 minutes. The drilling fluid cup was removed; and the excess fluid on the sleeve was allowed to drip. The weight of the sleeve with drilling fluid on the surface was measured and recorded as Mass B. The sleeve was placed back to rheometer. The cement slurry with the surfactant was loaded into a clean rheology cup. The cup was placed on the base and raised up slowly until the spacer is even with the line inscribed on the outer surface of the rotary sleeve. The cup was rotated at 100 RPM in 10 minutes. The cup was removed, and the cleanliness of the sleeve was visually observed. Water was loaded into a clean rheology cup. The cup was placed on the base and raised up slowly until the water was even with the line inscribed on the outer surface of the rotary sleeve. The sleeve was rotated at 100 RPM for 5 minutes. The cup was removed and the cleanliness of the sleeve was visually observed. The sleeve was dried, and weight of the dried sleeve was recorded as Mass C. The cleaning percentage is calculated based on the equation below:

$$\text{The cleaning percentage} = \frac{\text{The amount of drilling fluid removed from the surface of sleeve}}{\text{The originally amount of drilling fluid on the surface of sleeve}} \times 100\%,$$

wherein the amount of drilling fluid removed from the surface of sleeve=Mass B—Mass C, and the originally amount of drilling fluid on the surface of sleeve=Mass B—Mass A.

Example 1

The baseline cement slurry was prepared by admixing Class G cement, 0.3 gallons per sack of a gelling agent, 0.2 gallons per sack of a fluid loss control agent, 0.06 gallons per sack of an anti-settling agent, 0.065 gallons per sack of a retarder, 0.04 gallons per sack of a dispersant, and 0.1 gallons per sack of a defoamer at a cement slurry density of 14.6 pound per gallon.

The cement slurry and the surfactant blend was prepared by admixing Class G cement, 0.3 gallons per sack of a gelling agent, 0.2 gallons per sack of a fluid loss control agent, 0.06 gallons per sack of an anti-settling agent, 0.12 gallons per sack of a retarder, 0.01 gallons per sack of a dispersant, 0.1 gallons per sack of a defoamer, and 0.3 gallons per sack of surfactant #1 (coconut fatty alcohol ethoxylate butylether with concentration as 90-100%) at a cement slurry density of 14.6 pound per gallon.

Figure 3A:
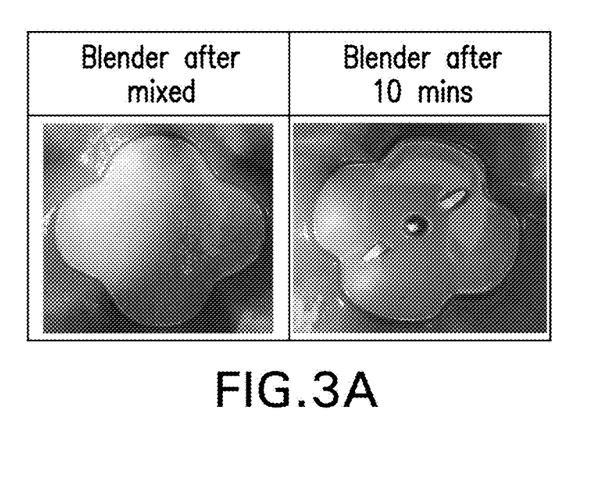
FIG. 3A illustrates the foaming tendency of a cement slurry containing surfactant #1 in a blender.
Figure 3B:
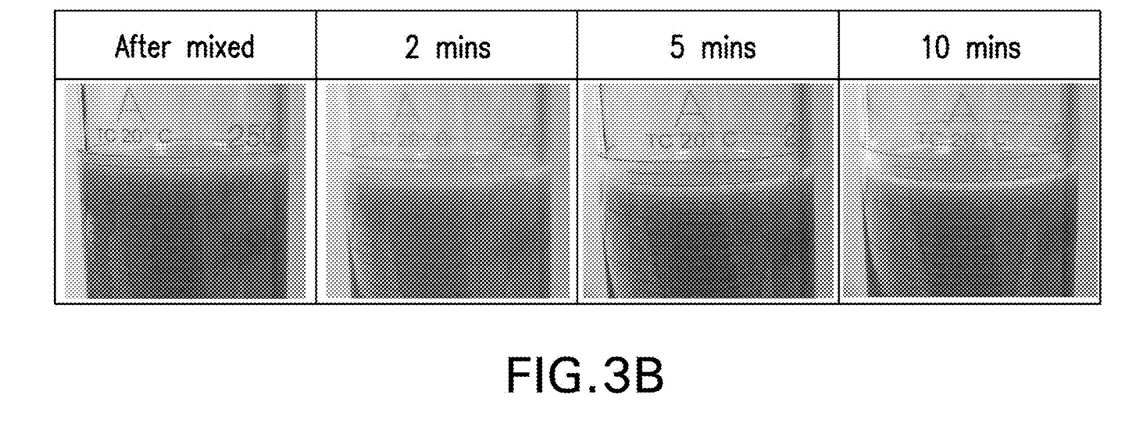
FIG. 3B illustrates the foaming tendency of a cement slurry containing surfactant #1 in a graduated cylinder.

FIG. 3A illustrates foaming tendency of the cement slurry containing surfactant #1 in a blender; and FIG. 3B illustrates the foaming tendency of a cement slurry containing surfactant #1 in a graduated cylinder. These figures show that cement slurry containing surfactant #1 does not generate foams after mixing.

The Fann degree viscosities of the baseline cement slurry and the cement slurry with surfactant #1 are shown in Table 1. The results show that the baseline cement slurry and the cement slurry with surfactant #1 have comparable viscosity at ambient temperature and elevated temperatures such as 131° F.

Figure 4:
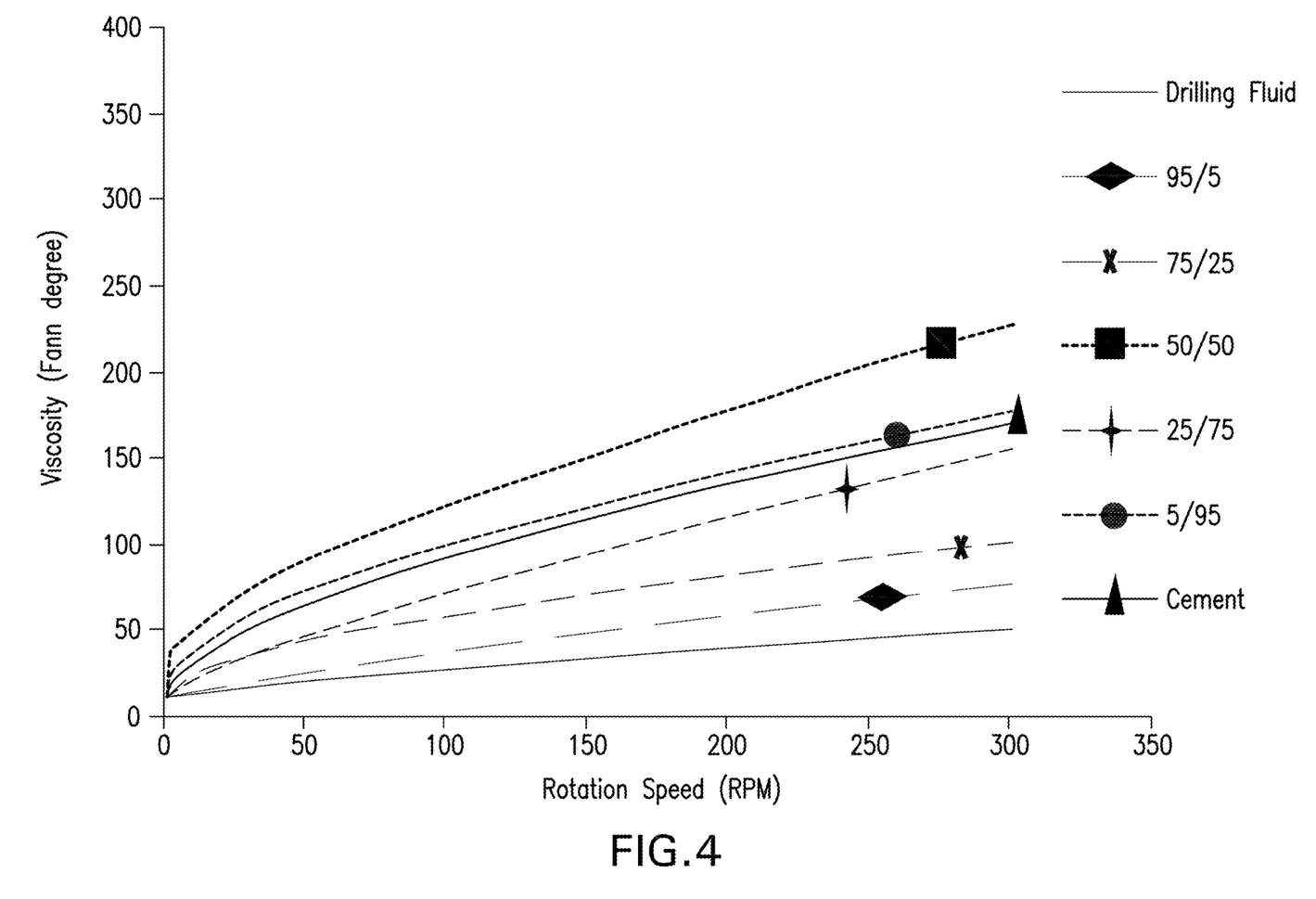
FIG. 4 shows the compatibility test results of an oil-based drilling fluid and a cement slurry containing surfactant #1 at 131° F.

FIG. 4 shows the compatibility test results of an oil-based drilling fluid and the cement slurry containing surfactant #1 at 131° F., where the weight ratio of the drilling fluid relative to the cement slurry with surfactant is between 95:5 to 5:95. The results indicate that the oil-based drilling fluid are compatible with the cement slurry containing surfactant #1 when the two fluids have various relative weight ratios.

The set time, fluid loss, compressive strength and free fluids were evaluated, and the results are shown in Table 2. The results indicate that that surfactant #1 has minimal adverse effects on the compressive strength and set time of the cement slurry.

The cleaning percentage was calculated to be 97.6% as shown in Table 3. The data indicates that the cement slurry containing surfactant #1 can effectively displace the oil-based drilling fluid.

TABLE 3

| Mass A | 97.71 g |
|---|---|
| Mass B | 99.35 g |
| Mass C | 97.75 g |
| Cleaning Percentage | 97.6% |

Example 2

The baseline cement slurry was prepared by admixing Class G cement, 0.3 gallons per sack of a gelling agent, 0.2 gallons per sack of a fluid loss control agent, 0.06 gallons per sack of an anti-settling agent, 0.065 gallons per sack of a retarder, 0.04 gallons per sack of a dispersant, 0.1 gallons per sack of a defoamer at a cement slurry density of 14.6 pound per gallon.

The cement slurry with surfactant was prepared by admixing Class G cement, 0.35 gallons per sack of a gelling agent, 0.2 gallons per sack of a fluid loss control agent, 0.1 gallons per sack of an anti-settling agent, 0.1 gallons per sack of a retarder, 0.1 gallons per sack of a defoamer, 0.5 gallons per sack of surfactant #2 (2-ethyl hexanol EO-PO nonionic surfactant with concentration greater than 99%) at a cement slurry density of 14.6 pound per gallon.

Figure 5A:
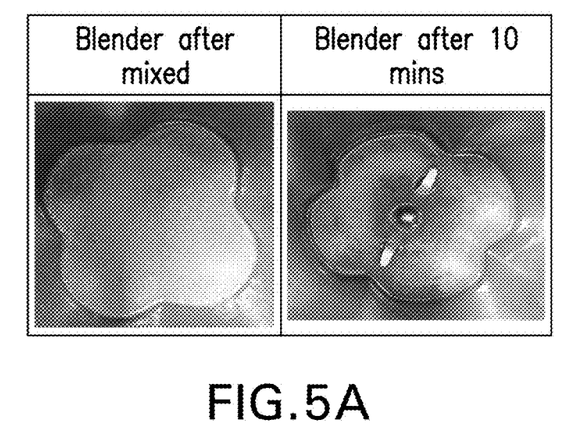
FIG. 5A illustrates the foaming tendency of a cement slurry containing surfactant #2 in a blender.
Figure 5B:
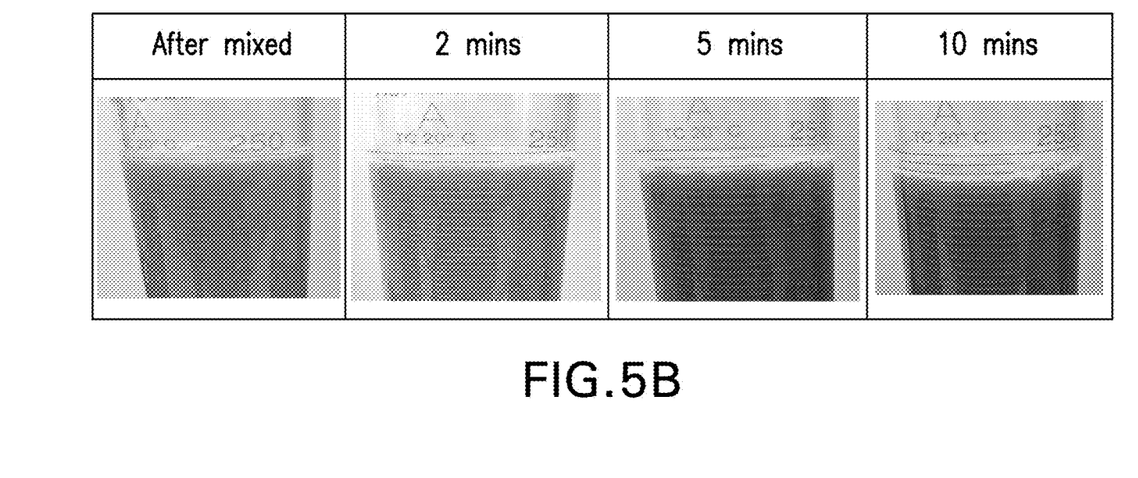
FIG. 5B illustrates the foaming tendency of a cement slurry containing surfactant #2 in a graduated cylinder.

FIG. 5A illustrates the foaming tendency of the cement slurry containing surfactant #2 in a blender; and FIG. 5B illustrates the foaming tendency of a cement slurry containing surfactant #2 in a graduated cylinder. These figures show that cement slurry containing surfactant #2 does not generate foams after mixing.

The Fann degree viscosities of the baseline cement slurry and the cement slurry with surfactant #2 are shown in Table 4. The results show that the baseline cement slurry and the cement slurry with surfactant #2 have comparable viscosity at ambient temperature and elevated temperatures such as 131° F.

Figure 6:
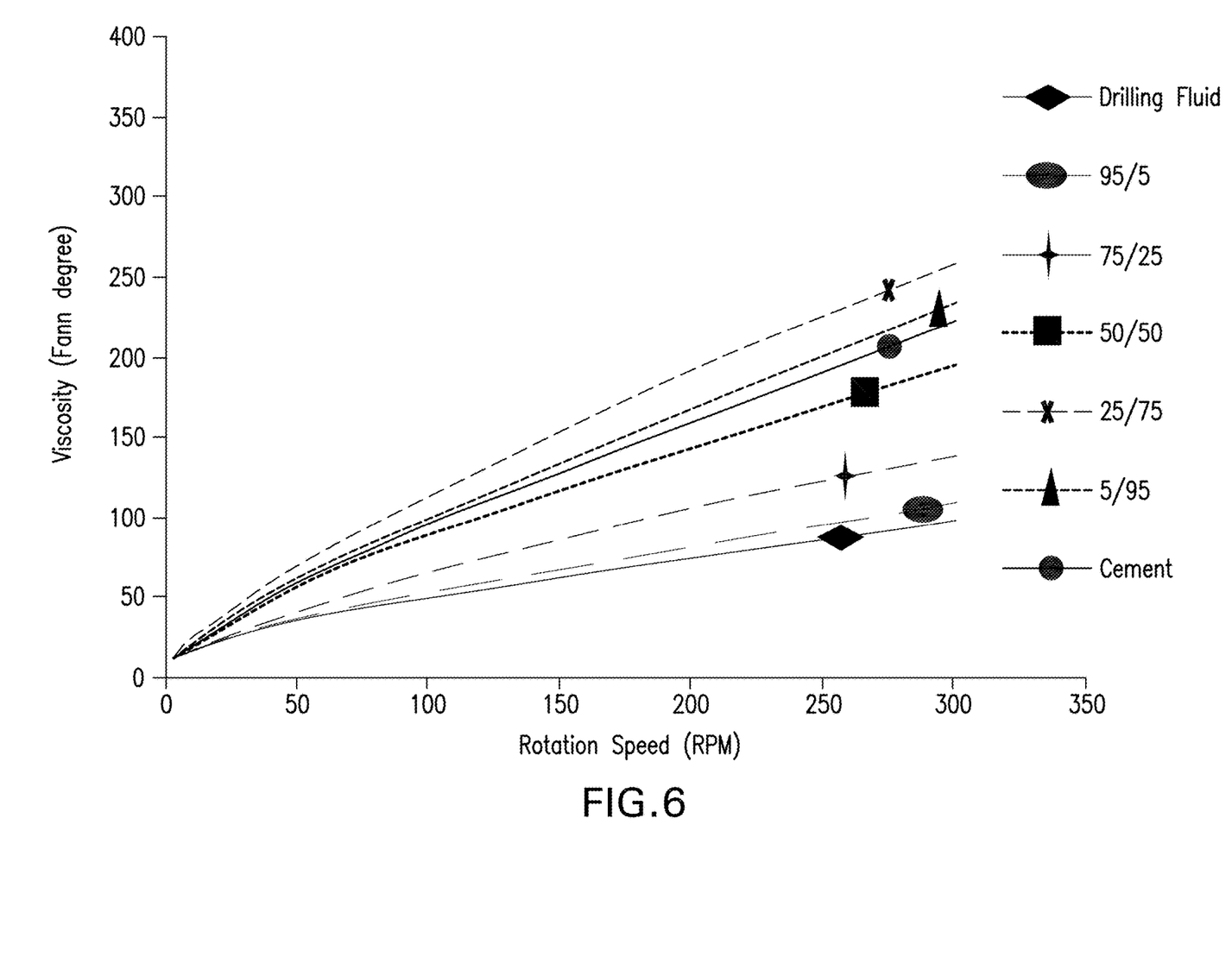
FIG. 6 shows the compatibility test results of an oil-based drilling fluid and a cement slurry containing surfactant #2 at 131° F.

FIG. 6 shows the compatibility test results of an oil-based drilling fluid and the cement slurry containing surfactant #2 at 131° F., where the weight ratio of the drilling fluid relative to the cement slurry with surfactant is between 95:5 to 5:95. The results indicate that the oil-based drilling fluid are compatible with the cement slurry containing surfactant #2 when the two fluids have various relative weight ratios.

The set time, fluid loss, compressive strength and free fluids were evaluated, and the results are shown in Table 5. The results indicate that that surfactant #2 has minimal adverse effects on the compressive strength and set time of the cement slurry.

TABLE 1

| | | Viscosity (Fann degree) | | | | | | |
|---|---|---|---|---|---|---|---|---|
| | | 300 RPM | 200 RPM | 100 RPM | 60 RPM | 30 RPM | 6 RPM | 3 RPM |
| Baseline cement slurry | Ambient | 226 | 185 | 129 | 101 | 72 | 36 | 26 |
| | 131° F. | 205 | 167 | 115 | 90 | 64 | 32 | 23 |
| Cement slurry with surfactant #1 | Ambient | 214 | 169 | 113 | 85 | 58 | 25 | 19 |
| | 131° F. | 170 | 135 | 92 | 70 | 50 | 24 | 19 |

TABLE 2

| | Fluid Loss cm³'s/ 30 mins | Thickening Time hh:mm | UCA @ 50 psi hh:mm | UCA @ 500 psi hh:mm | Free Fluid mL |
|---|---|---|---|---|---|
| Baseline cement slurry | — | 10:41 | 15:07 | 20:03 | 0 |
| Cement slurry with surfactant #1 | 54 | 10:05 | 8:51 | 11:12 | 0 |

TABLE 4

| | | Viscosity (Fann degree) | | | | | | |
|---|---|---|---|---|---|---|---|---|
| | | 300 RPM | 200 RPM | 100 RPM | 60 RPM | 30 RPM | 6 RPM | 3 RPM |
| Baseline cement slurry | Ambient | 226 | 185 | 129 | 101 | 72 | 36 | 26 |
| | 131° F. | 205 | 167 | 115 | 90 | 64 | 32 | 23 |
| Cement slurry with surfactant #2 | Ambient | 222 | 160 | 96 | 67 | 41 | 14 | 0 |
| | 131° F. | 368 | 273 | 168 | 121 | 85 | 53 | 46 |

TABLE 5

| | Fluid Loss cm³'s/ 30 mins | Thickening Time hh:mm | UCA @ 50 psi hh:mm | UCA @ 500 psi hh:mm | Free Fluid mL |
|---|---|---|---|---|---|
| Baseline cement slurry | — | 10:41 | 15:07 | 20:03 | 0 |
| Cement shiny with surfactant #2 | 42 | 7:51 | 13:13 | 16:03 | 0.95 |

Further included in this disclosure are the following specific embodiments, which do not necessarily limit the claims.

Embodiment 1. A method of cementing a wellbore, the method comprising: injecting into the wellbore a non-aqueous fluid; injecting into the wellbore a cement slurry and a non-ionic surfactant composition after injecting the non-aqueous fluid; and allowing the cement slurry to set, wherein the non-ionic surfactant composition comprises an alkyl end-capped ethoxylated fatty alcohol, a chain extended non-ionic surfactant, or a combination comprising at least one of the foregoing.

Embodiment 2. The method as in any prior embodiment, wherein a spacer fluid is injected between the non-aqueous fluid and the cement slurry.

Embodiment 3. The method as in any prior embodiment, wherein no spacer fluid is injected between the non-aqueous fluid and the cement slurry, and the cement slurry is in direct physical contact with the non-aqueous fluid in the wellbore.

Embodiment 4. The method as in any prior embodiment, wherein the chain extended non-ionic surfactant has a structure represented by the formula: R-$[L]_x$-$[O-CH_2-CH_2]_y$-OH, where R is a linear or branched, saturated or unsaturated, substituted or unsubstituted, aliphatic or aromatic hydrocarbon radical having from about 6 to 20 carbon atoms; L is a block of poly-propylene oxide, a block of poly-ethylene oxide, a block of poly-butylene oxide or a combination thereof; x is 3 to 30; and y is 1 to 5. More preferably, the chain extended non-ionic surfactant has a structure represented by the formula R—$[O-CH_2-CH_2]_a$$[O-CH(CH_3)CH_2]_b$—$[O-CH_2-CH_2]_y$—OH, where R is an aliphatic group having from about 6 to about 20 carbon atoms, y is 1 to 5, and the sum of a and b is from 3 to 30.

The alkyl end-capped ethoxylated fatty alcohol has a structure represented by the formula $R^1$—O—$(CH_2-CH_2-O)_m R^2$, wherein $R^1$ is a saturated or unsaturated, linear or branched hydrocarbon radical having from 10 to 24 carbon atoms, $R^2$ is a linear or branched alkyl having from 1 to 10 carbon atoms, and m is an integer ranging from 3 to 50. Preferably $R^1$ is a $C_{12-18}$ alkyl, $R^2$ is butyl, and m is 5.

Embodiment 5. The method as in any prior embodiment, wherein the non-ionic surfactant composition has a hydrophilic-lipophilic balance (HLB) of about 6 to about 13.5.

Embodiment 6. The method as in any prior embodiment, wherein the cement slurry comprises an aqueous carrier, a cement component, and an additive comprising a setting accelerator, a setting retardant, a gelling agent, a fluid loss control agent, an extender, a defoamer, a weighting agent, a dispersant, a thixotropic agent, a bridging agent or lost circulation material, a silicate material, a clay stabilizer, or a combination comprising at least one of the foregoing.

Embodiment 7. The method as in any prior embodiment, wherein the non-ionic surfactant composition is injected in an amount of about 0.1 to about 1 gallon per sack of the cement component.

Embodiment 8. The method as in any prior embodiment, wherein the cement slurry has a density of about 7 to about 22 pounds per gallon.

Embodiment 9. The method as in any prior embodiment, wherein the non-ionic surfactant composition is added to the cement slurry via an additive injection nozzle or a chemical injection pump while the cement slurry is injected into the wellbore.

Embodiment 10. The method as in any prior embodiment, further comprising adjusting amounts of the cement slurry, the non-ionic surfactant composition, or a combination thereof in situ while the cement slurry and the surfactant composition are injected into the wellbore.

Embodiment 11. The method as in any prior embodiment, wherein the cement slurry is premixed with the non-ionic surfactant composition in a vessel to form a mixing water fluid for final cement slurry, and injected into the wellbore.

Embodiment 12. The method as in any prior embodiment, wherein the non-aqueous fluid is an oil-based drilling fluid.

Embodiment 13. The method as in any prior embodiment, wherein the oil-based drilling fluid is all-oil based or a water-in-oil emulsion; and the drilling fluid comprises a diesel oil, a paraffin oil, a vegetable oil, a soybean oil, a mineral oil, an aliphatic solvent, an aromatic solvent, or a synthetic oil, or a combination comprising at least one of the foregoing.

Embodiment 14. The method as in any prior embodiment, further comprising displacing the non-aqueous fluid with the cement slurry and the non-ionic surfactant composition.

Embodiment 15. The method as in any prior embodiment, wherein the cement slurry with the non-ionic surfactant composition intermixed with the non-aqueous fluid hardens creating a sealing material with improved elastic properties.

All ranges disclosed herein are inclusive of the endpoints, and the endpoints are independently combinable with each other. As used herein, "combination" is inclusive of blends, mixtures, alloys, reaction products, and the like. The size of the particles refers to the largest dimension of the particles and can be determined by high resolution electron or atomic force microscope technology. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." The modifier "about" used in connection with a quantity is inclusive of the stated value and has the meaning dictated by the context (e.g., it includes the degree of error associated with measurement of the particular quantity).

What is claimed is:

1. A method of cementing a wellbore, the method comprising:
    injecting into the wellbore a non-aqueous fluid;
    injecting into the wellbore a cement slurry and a non-ionic surfactant composition after injecting the non-aqueous fluid, the cement slurry comprising an aqueous carrier and a cement component, and the cement component comprising a Portland cement; and
    allowing the cement slurry to set,
    wherein the non-ionic surfactant composition comprises a chain extended non-ionic surfactant, and
    the chain extended non-ionic surfactant has a structure represented by the formula: $R\text{-}[L]_x\text{-}[O\text{---}CH_2\text{---}CH_2]_y\text{---}OH$,
    where R is a linear or branched, saturated or unsaturated, substituted or unsubstituted, aliphatic or aromatic hydrocarbon radical having from about 6 to 20 carbon atoms;
    L is a block of poly-propylene oxide, a block of poly-ethylene oxide, a block of poly-butylene oxide or a combination thereof;
    x is 3 to 30; and y is 1 to 5,
    wherein no spacer fluid is injected between the non-aqueous fluid and the cement slurry, and the cement slurry is in direct physical contact with the non-aqueous fluid in the wellbore.

2. The method of claim 1, wherein the chain extended non-ionic surfactant has a structure represented by the formula $R\text{---}[O\text{---}CH_2\text{---}CH_2]_a\text{---}[O\text{---}CH(CH_3)CH_2]_b\text{---}[O\text{---}CH_2\text{---}CH_2]_y\text{---}OH$, where R is an aliphatic group having from about 6 to about 20 carbon atoms, y is 1 to 5, and the sum of a and b is from 3 to 30.

3. The method of claim 1, wherein the non-ionic surfactant composition has a hydrophilic-lipophilic balance (HLB) of about 6 to about 13.5.

4. The method of claim 1, wherein the cement slurry comprises an aqueous carrier, a cement component, and an additive, and wherein the additive comprises a setting accelerator, a setting retardant, a gelling agent, a fluid loss control agent, an extender, a defoamer, a weighting agent, a dispersant, a thixotropic agent, a bridging agent or lost circulation material, a silicate material, a clay stabilizer, or a combination comprising at least one of the foregoing.

5. The method of claim 4, wherein the non-ionic surfactant composition is injected in an amount of about 0.1 to about 1 gallon per sack of the cement component.

6. The method of claim 1, wherein the cement slurry has a density of about 7 to about 22 pounds per gallon.

7. The method of claim 1, wherein the non-ionic surfactant composition is added to the cement slurry via an additive injection nozzle or a chemical injection pump while the cement slurry is injected into the wellbore.

8. The method of claim 1, further comprising adjusting amounts of the cement slurry, the non-ionic surfactant composition, or a combination thereof in situ while the cement slurry and the non-ionic surfactant composition are injected into the wellbore.

9. The method of claim 1, wherein the cement slurry is premixed with the non-ionic surfactant composition in a vessel to form a mixing water fluid for final cement slurry, and injected into the wellbore.

10. The method of claim 1, wherein the non-aqueous fluid is an oil-based drilling fluid.

11. The method of claim 10, wherein the oil-based drilling fluid is all-oil based or a water-in-oil emulsion; and the drilling fluid comprises a diesel oil, a paraffin oil, a vegetable oil, a soybean oil, a mineral oil, an aliphatic solvent, an aromatic solvent, or a synthetic oil, or a combination comprising at least one of the foregoing.

12. The method of claim 1, further comprising displacing the non-aqueous fluid with the cement slurry and the non-ionic surfactant composition.

13. The method of claim 1, wherein the cement slurry with the non-ionic surfactant composition intermixed with the non-aqueous fluid hardens creating a sealing material with elastic properties.

* * * * *